Figure 1:
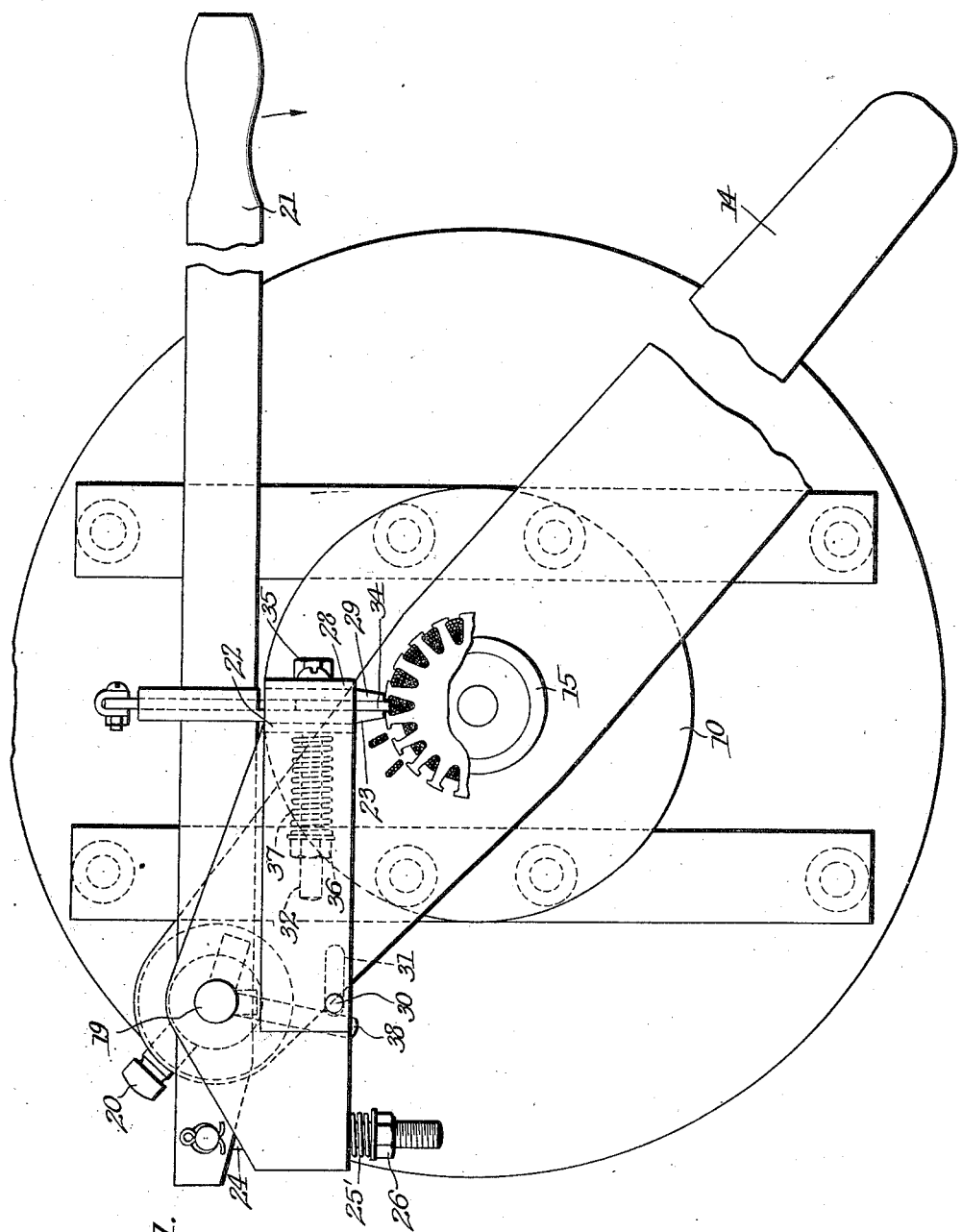

Nov. 22, 1927.

P. H. WHITE 1,650,558

MACHINE AND METHOD FOR POSITIONING ARMATURE WINDINGS

Filed June 23, 1927

3 Sheets-Sheet 1

INVENTOR
Paul H. White
BY
ATTORNEY

Nov. 22, 1927.

P. H. WHITE 1,650,558

MACHINE AND METHOD FOR POSITIONING ARMATURE WINDINGS

Filed June 23, 1927 3 Sheets-Sheet 2

INVENTOR
Paul H. White
BY
ATTORNEY

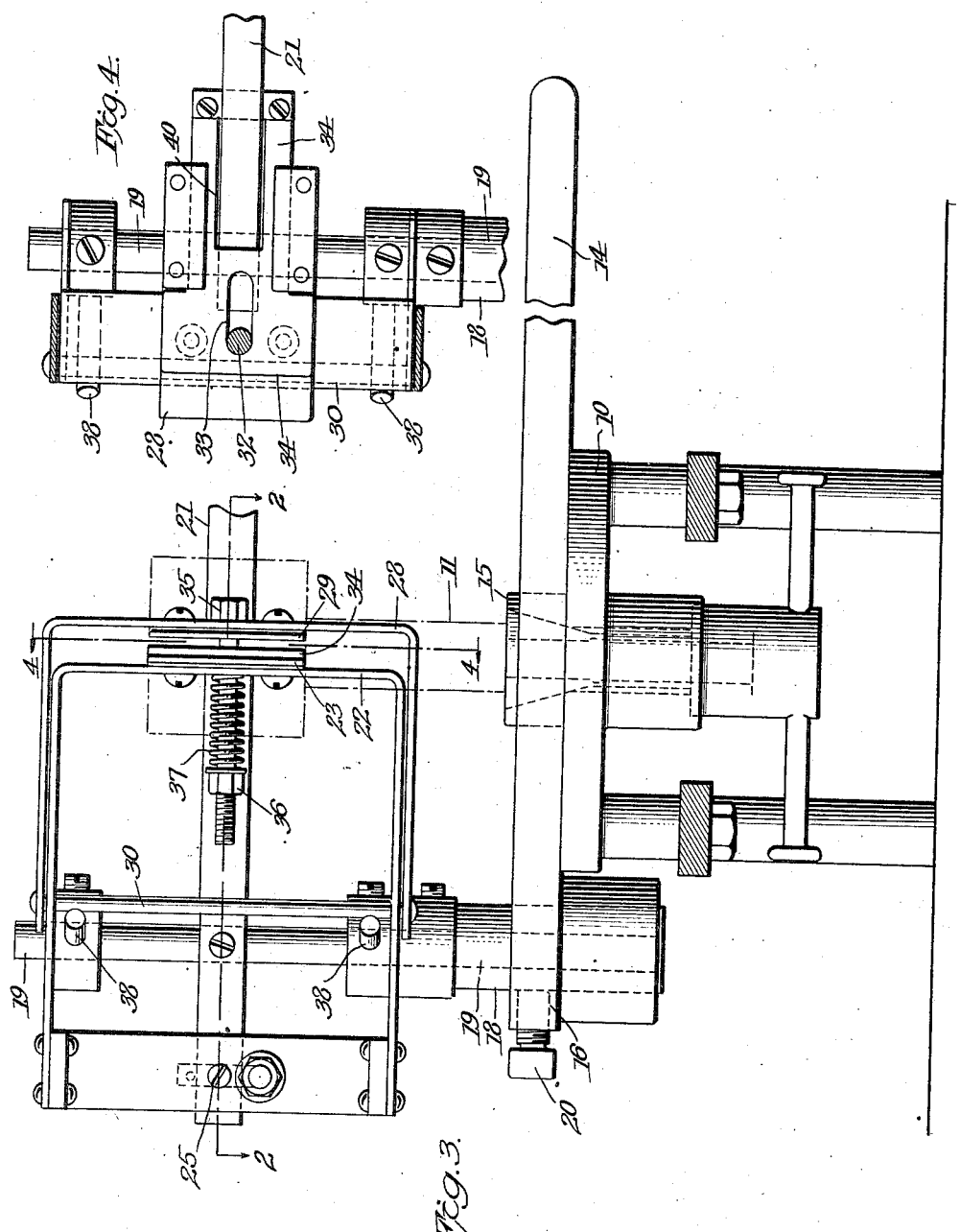

Patented Nov. 22, 1927.

1,650,558

UNITED STATES PATENT OFFICE.

PAUL H. WHITE, OF INDIANAPOLIS, INDIANA.

MACHINE AND METHOD FOR POSITIONING ARMATURE WINDINGS.

Application filed June 23, 1927. Serial No. 200,965.

My invention relates to machines for positioning form wound armature coils symmetrically in and upon an armature core for their proper connection to the commutator.

In the manufacture of small armatures for dynamo electric machines, the usual practice has been to wind the wires of the first coil directly on the iron core. Each succeeding coil wound thereafter wraps over some of the coils previously wound and all of the last coil wraps over previously laid wires. Hence, as the winding progresses, the length of the wire in each coil increases and thereby disturbs the electrical balance due to the increased resistance in the longer coils. My invention seeks to correct such defects by having the coils all "form wound" as a separate operation, which insures exact similarity in form, size and electrical resistance and allows them to be separately insulated before assembling into the armature core.

In carrying out my invention, three steps are necessary in the assembling of an armature. The first consists in winding and insulating a set of form wound coils each having the proper number of turns of the proper size wire, all similar in dimensions, form and resistance. A second step provides for placing one side of each of a complete set of form wound coils in the bottom of each of the several slots of an armature by the aid of a simple device. The third step of the process provides for placing the remaining side of the form wound coil in the slot of the armature coil on top of the first coil side previously inserted.

My invention is concerned primarily with the apparatus and method of carrying out the third step in the above mentioned process.

In a patent to Cullin, 1,402,217, is disclosed a machine for placing the first set of form coils in the bottom of each of the several slots of the armature, then rotating the armature and placing the second set of form wound coils on top of the ones previously placed in the slots. In the device shown in this patent, the two steps are carried out by a single machine and the armature is positioned to rotate upon a suitable centering fixture. The apparatus of Cullin, although it performs the two steps with one machine is a relatively expensive machine and an expensive operation and requires the armature to be held from rotating by hand while the second coil side is being inserted.

In the second step in the assembling of an armature of the type under consideration, the form wound coils are first placed in the bottoms of the slots on the armature core by hand. In some instances, these cores are further firmly seated in the bottoms of the slots by a simple plunger. In the device sought to be patented by this application, this step in the process described above is performed by a simple machine of conventional construction such, for example, as the member 18 and 21 in the patent to Cullin. This plunger, however, may be dispensed with since the form will be firmly pressed within its seat by the second set of windings positioned in carrying out the third step of the process. My invention provides mechanism for carrying out the third step of the above mentioned process by means of a relatively simple, inexpensive but highly efficient machine.

With these and incidental objects in view, the invention consists in certain novel features of construction and combinations of parts, the essential elements of which are set forth in the appended claims, and a preferred form of one embodiment of which is hereinafter described with reference to the drawings which accompany and form part of these specifications.

Figure 2:
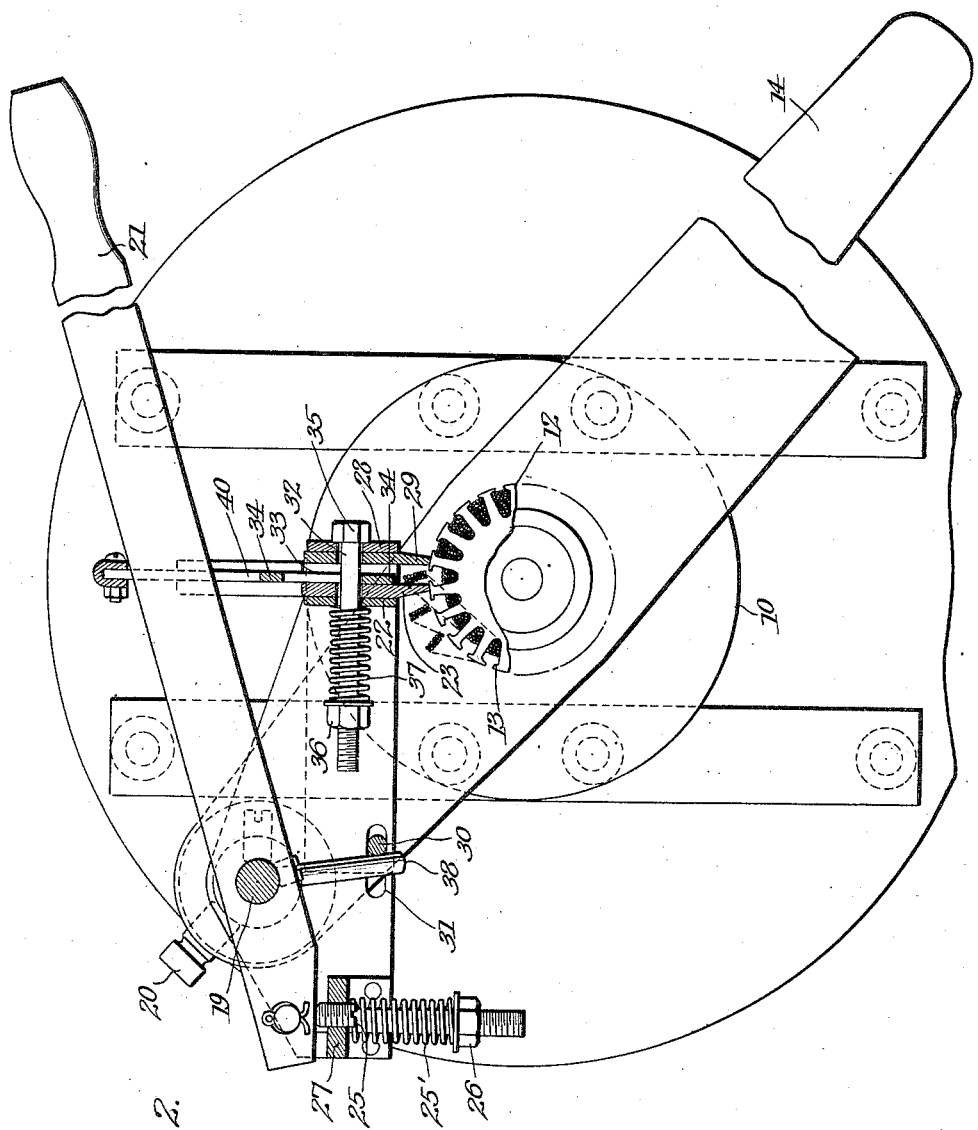

In the drawings, which are made a part hereof and in which similar reference characters indicate similar parts, Figure 1 is a plan view of the device when the insertion of the coil is completed, Figure 2, a sectional view showing an intermediate position of the positioning device taken on the line 2—2 of Fig. 3, Figure 3, a side elevation of the device, and Figure 4, a section on the line 4—4 of Fig. 3 showing the jaw and jaw frame as seen by the operator.

Referring now to the drawings, 10 indicates a pedestal upon which the apparatus is mounted. An armature shaft 11 carrying an armature core 12 is vertically positioned on the top of the pedestal 10 and securely fixed thereto against rotation. The armature core 12 is provided with radial slots 13 around its periphery. The said slots are somewhat heart shaped in cross section with a narrow opening at the periphery through which the form wound coils must be inserted.

Mechanism for positioning the coils within the slots just mentioned and for pressing them tightly therein is as follows. A lever 14, hereinafter called an indexing lever, is pivoted at or near its middle point upon a boss 15 fixed to the top of the pedestal or table 10. The swinging end 16 of the indexing lever 14 has adjustably mounted therein a collar or bearing 18 in which is carried the stud or pin 19. The collar 18 is held in position by a set screw 20 and allows axial adjustment of the collar to take care of armatures of different lengths. A lever 21, hereinafter called an inserting lever, is carried on the stud 19 carried by the indexing lever 14. On the stud 19 also is pivoted a jaw frame 22. The jaw frame 22 is made of relatively thin material and shaped into an approximate parallelogram. Upon one end of this frame is fastened by means of screws or rivets an indexing or main jaw 23. The other end of the frame is connected by means of a link 24 with the lever 21. A screw 25 within the rear frame member is adjustable to vary the distance between which the end of the jaw may move relatively to the end of the inserting lever 21. A compression spring 25′ seated between a nut 26 and a member 27 on the jaw frame tends to urge the short end of the lever in a downward direction at this end, as shown in Fig. 2, for a purpose which will later appear. Mounted around the outside and enclosing one end and parts of two sides of the main frame 22, is a second jaw frame 28 to which is fastened the working or clamping jaw 29. This second frame is supported and held in relation to the main frame by a cross bar 30 connecting the two free sides of the second frame 28. This bar passes through slots 31 of the main frame 22 permitting a parallel motion to take place between the two jaw frames. The jaw ends of both frames are held in alignment by means of the bolt 32 sliding directly through the jaws and a corresponding slot 33 in a plunger 34. This slot permits a reciprocating motion of the plunger 34.

The bolt 32 has a head 35 outside of the working jaw 28, and a nut 36 upon the other end of the bolt confines a spring 37 against a side of the jaw frame 22. The tension of the spring is adjusted so as to exert sufficient pressure between the jaws to compress the bundle of coiled side wires into a narrow band so that they will just enter the slot opening in the periphery of the armature. The thickness of the narrow band is gaged by the thickness of the main plunger 34. It will be observed that the inserting lever 21 carries an arm or trigger 38 which rests upon a pin or cross bar 30. When the lever 21 is in the position shown in Fig. 2, the jaw 29 is in the position shown in Fig. 2, at which time the spring 37 is under increased tension but cannot draw the jaw 29 against the work since it is held by the bar 30. When the inserting lever 21 is brought to the position shown in Fig. 1, the spring 37 brings the clamping jaws together as the trigger 38 permits the bar 30 to move to the left as shown in Fig. 1. As will be observed, at the opposite end of the frame there is a compression spring 25′ which connects the insertion lever 21 and the main jaw frame 22. An adjusting screw 25 in the end cross member of the main jaw frame 22 limits the amount of the movement in one direction between the insertion lever 21 and the main jaw frame 22. The jaws are opened by the compression spring 25′ connecting the inserting lever 21 and the main frame 22. The compression spring 25′ must obviously overcome the pressure of the jaw spring 37 in order always to have the jaws when at rest in an open position.

Mention has been made of the plunger 34. This will now be further explained. The plunger 34 is relatively wide and thin or of the thickness to which it is desired to compress the form wound coils that are to be inserted in the radial slots, so that it will just enter the slot freely while pushing the bundle of coil side wires into the slot. It is adapted to slide between the jaws 23 and 29 but is constrained to the surface of the main jaw 23. Guides of any sort that will hold it to travel normal to the armature core surface will suffice. It is provided with a slot 33 to permit it to slide across the bolt 32. Upon its outer end it is provided with an enlarged slot opening 40 through which the insertion lever 21 passes. The slot 40 allows the lever 21 to have a slight lost motion in its travel without moving the plunger 34, so that the coil sides are compressed and gaged before being pushed into the armature slot.

The operation of the device is as follows: The form wound coils are first placed on the armature core with one side of a series positioned in the radial slots in the core. An armature core is then placed vertically on the top of the table or pedestal and securely clamped against rotation. The indexing lever is pivoted on a boss around the armature shaft which boss is fixed to the top of the table. The operator takes his position between the indexing lever 14 and the inserting lever 21. One side of the set of coils having been previously positioned in the bottoms of the radial slots on the armature core, the operator inserts a wound coil between the jaws 23 and 29. By means of the indexing lever 14 the whole apparatus is swung about the armature shaft as a pivot until the jaw 23 is properly aligned with the proper slot in the armature periphery. The lever 21 is then drawn toward the armature core which releases the bar 30 and allows the spring 37 to compress the bundle of coils to the proper thickness for insertion in the slot in the armature. Further movement of the lever 21 will force the plunger 34 down upon the compressed form and force it through the narrow opening of the peripheral slot. After the bundle of wires have entered the slot, it will be observed that, due to the form of the slot, these wires may then expand so as to fit the shape of the slot. The lever 21 is then moved away from the armature core and the indexing lever 14 is then moved about its pivot 15 to position the surface of the jaw 23 against the next coil side and position it at the corresponding edge of the next slot in the armature preparatory to repeat the inserting operation just mentioned. In carrying out the operation just mentioned, it is desired to call attention to the difference in operation between this device and the one shown in the patent above mentioned. In this device the armature is held in a vertical position and held rigidly relieving the hand of much effort. In the device of the patent, the armature must be horizontally positioned and must be rotatable and must be controlled by hand. In the device herein shown, the operator moves about the pedestal or table to index the jaws around the armature. In the device herein shown, two devices are necessary for carrying out the two steps of positioning of an armature winding. These two apparatuses are less expensive and less complicated than the single apparatus shown in the patent to Cullin and from the standpoint of speed of operation and effort required and the consequent cost of producing armatures is much less. It will be recalled that in both instances the form coils have been previously wound on machines especially designed for that work.

While the form of mechanism herein shown and described is admirably adapted to fulfill the objects primarily stated, it is to be understood that it is not intended to confine the invention to the one form of embodiment shown, as it is capable of embodiment in various forms all coming within the scope of the appended claims.

Having thus fully described my said invention, what I claim as new and desire to secure by Letters Patent, is:

1. In a machine of the class described a support, means for rigidly securing an armature core thereto, means movable about said armature core for positioning coil inserting means before a radial slot in the armature core and means for reducing coil windings to their proper thickness and means to force said windings into radial slots in the armature core, substantially as set forth.

2. In a machine of the class described, the combination of a support for an armature core of an electric machine, of a pair of arms movable about a pivot on said support, means for indexing the arms to correspond with slots in the armature core, means for compressing coil windings to the proper thickness to fit radial slots in the armature core, and means to force them into the slots in the armature core, substantially as set forth.

3. Means for positioning the second side of wound coils in an armature core comprising a lever pivoted around a vertical shaft, a second lever pivoted at the outer end of said first named lever, a pair of jaw frames connected operably to the last named lever, jaws upon said jaw frames, a plunger adapted to move between said jaws, means for moving said jaws to compress the windings to the proper thickness, and means operated by movement of the levers to open said jaws, substantially as set forth.

4. The process of making armatures which consists in mounting an armature core upon a support, manually inserting one side of form wound coils in the armature core slots and successively forcing a second side of a series of form wound coils on top of the first positioned series of sides, substantially as set forth.

5. The process of building armatures which consists in rigidly vertically mounting an armature core, placing within the bottom of the radial slots of the armature core a series of the sides of form wound coils, and then successively forcing a second series of the other sides of form wound coils upon the first named series and securing them therein, substantially as set forth.

6. An apparatus of the kind described comprising an indexing lever pivoted upon a support and carrying a swinging pivot at the end opposite its handle, said lever itself being adapted to rotate freely in a complete circle about its fulcrum, means for inserting the second series of the sides of form wound coils in an armature core which comprises a lever pivoted near its center and having a handle on one end and a swinging pivot stud on the other end, a second lever pivoted on said stud, a jaw frame pivoted on said stud, a second frame supported on said first named frame, a finger connected to said second named lever and means operable upon movement of the said second named lever for moving the jaw frames relatively to each other, substantially as set forth.

7. Means for inserting form wound coils in peripheral slots in an armature core which comprises means for rigidly supporting an armature core in a vertical position, means movable horizontally about said core for selectively positioning the device at each radial armature core slot, means for compressing form wound coils to fit the radial slots and means for forcing the compressed forms within the slots, substantially as set forth.

In witness whereof, I have hereunto set my hand at Indianapolis, Indiana this 9th day of May, A. D. nineteen hundred and twenty-seven.

PAUL H. WHITE.